(12) United States Patent
Chack

(10) Patent No.: US 6,438,599 B1
(45) Date of Patent: *Aug. 20, 2002

(54) METHOD AND APPARATUS FOR ESTABLISHING COMMUNICATION BETWEEN A TRANSACTION INITIATOR AND A TRANSACTION PROCESSING SYSTEM

(75) Inventor: Michael A. Chack, Pleasanton, CA (US)

(73) Assignee: Aspect Communications Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 33 days.

(21) Appl. No.: 09/054,755

(22) Filed: Apr. 3, 1998

(51) Int. Cl.[7] .............................................. G06F 15/16
(52) U.S. Cl. .................. 709/229; 709/219; 379/265.09; 705/26; 705/27; 705/39
(58) Field of Search ............................. 705/39, 26, 27; 379/93.12, 102.03, 88.13, 265.09; 709/219, 229

(56) References Cited

U.S. PATENT DOCUMENTS

| | | | | |
|---|---|---|---|---|
| 5,475,585 A | * | 12/1995 | Bush ............................ | 705/26 |
| 5,592,538 A | * | 1/1997 | Kosowsky et al. ...... | 379/93.08 |
| 5,721,832 A | * | 2/1998 | Westrope et al. ............. | 705/27 |
| 5,761,280 A | * | 6/1998 | Noonen et al. ........... | 379/93.27 |
| 5,793,972 A | * | 8/1998 | Shane ......................... | 709/219 |
| 5,802,526 A | * | 9/1998 | Fawcett et al. ........... | 379/88.13 |
| 5,838,682 A | * | 11/1998 | Dekelbaum et al. ...... | 379/93.12 |
| 5,915,001 A | * | 6/1999 | Uppaluru .................. | 379/88.22 |
| 5,918,213 A | * | 6/1999 | Bernard et al. ............... | 705/26 |
| 5,953,392 A | * | 9/1999 | Rhie et al. ................ | 379/88.13 |
| 5,963,915 A | * | 10/1999 | Kirsch .......................... | 705/26 |
| 6,085,229 A | * | 7/2000 | Newman et al. ............ | 709/203 |
| 6,101,537 A | * | 8/2000 | Edelstein et al. ........... | 709/219 |
| 6,128,663 A | * | 10/2000 | Thomas ....................... | 709/228 |
| 6,157,705 A | * | 12/2000 | Perrone .................... | 379/88.01 |

* cited by examiner

Primary Examiner—Zarni Maung
Assistant Examiner—Jagdish N Patel
(74) Attorney, Agent, or Firm—Blakely, Sokoloff, Taylor & Zafman LLP

(57) ABSTRACT

A system is provided for establishing communication between a transaction initiator and a transaction processing system, in which the transaction processing system has received a transaction from the transaction initiator. The system receives an identifier associated with the received transaction. This identifier is received from the transaction processing system. The transaction initiator is identified based on the identifier associated with the received transaction. A resource locator, such as a uniform resource locator (URL), is then provided to the transaction initiator. The resource locator is also provided to the transaction processing system. The system also determines a network address associated with the transaction initiator and provides the network address to the transaction processing system. The identifier associated with the received transaction can be the transaction initiator's telephone number, the transaction initiator's account number, or other information.

41 Claims, 11 Drawing Sheets

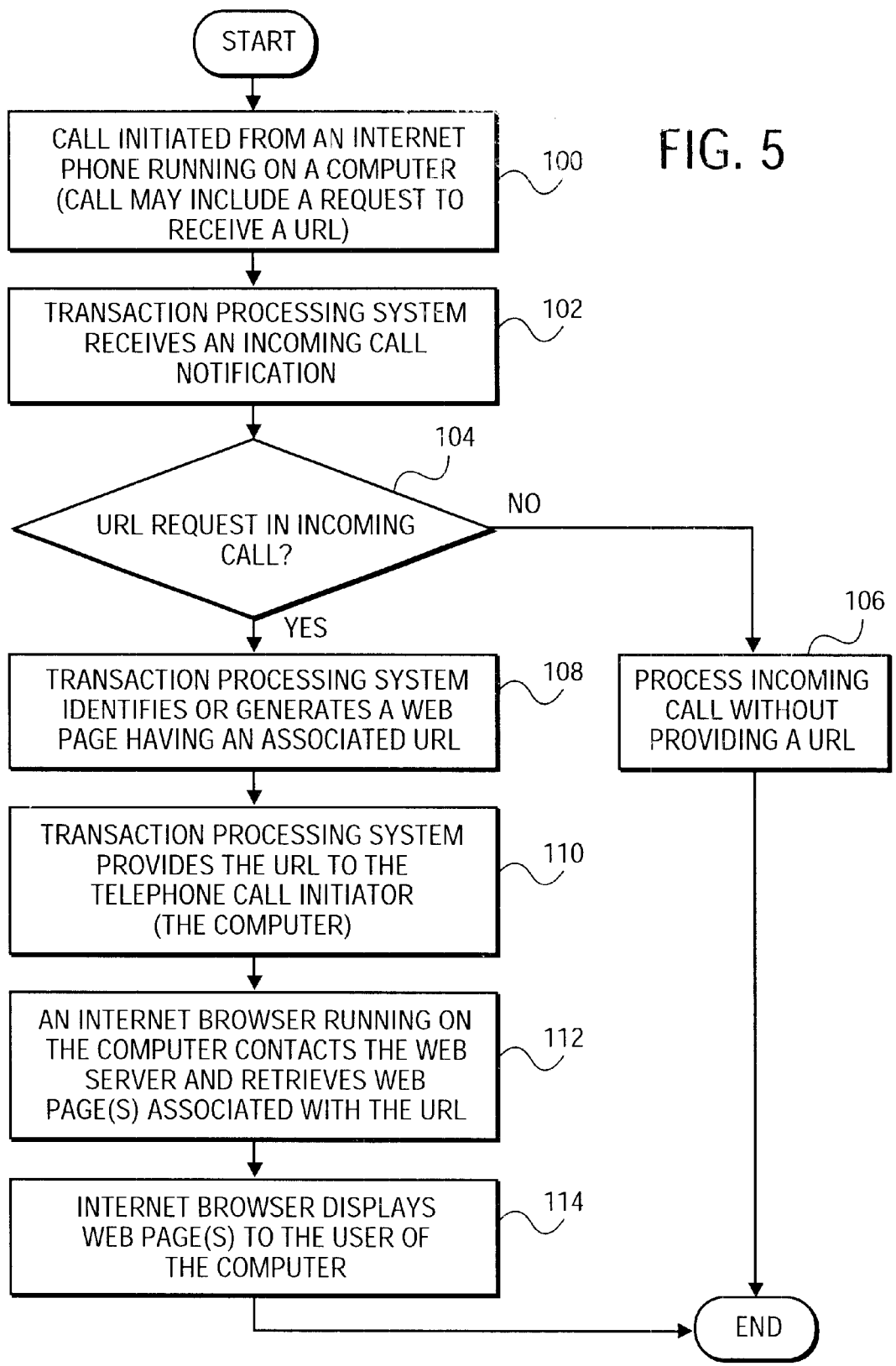

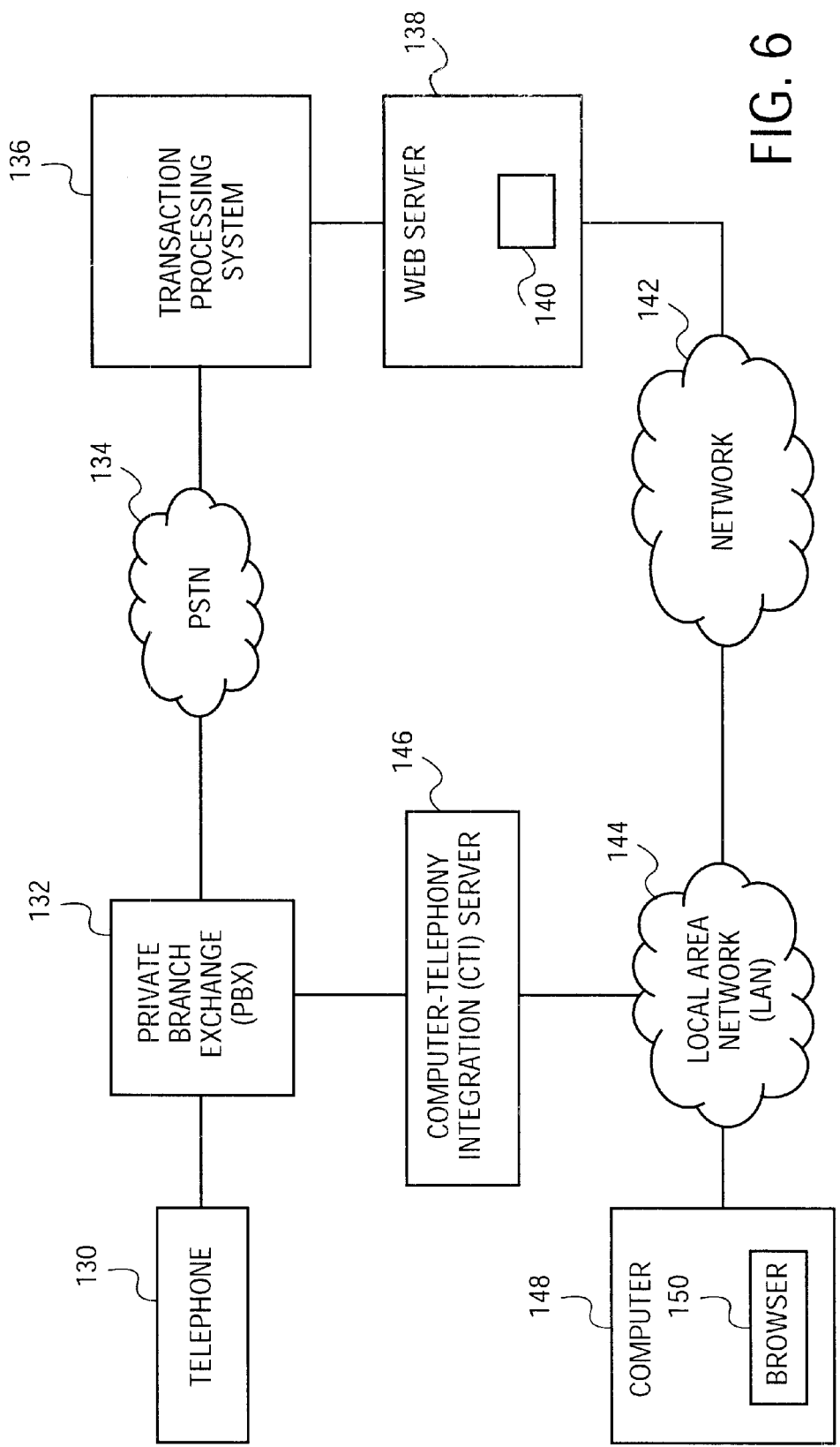

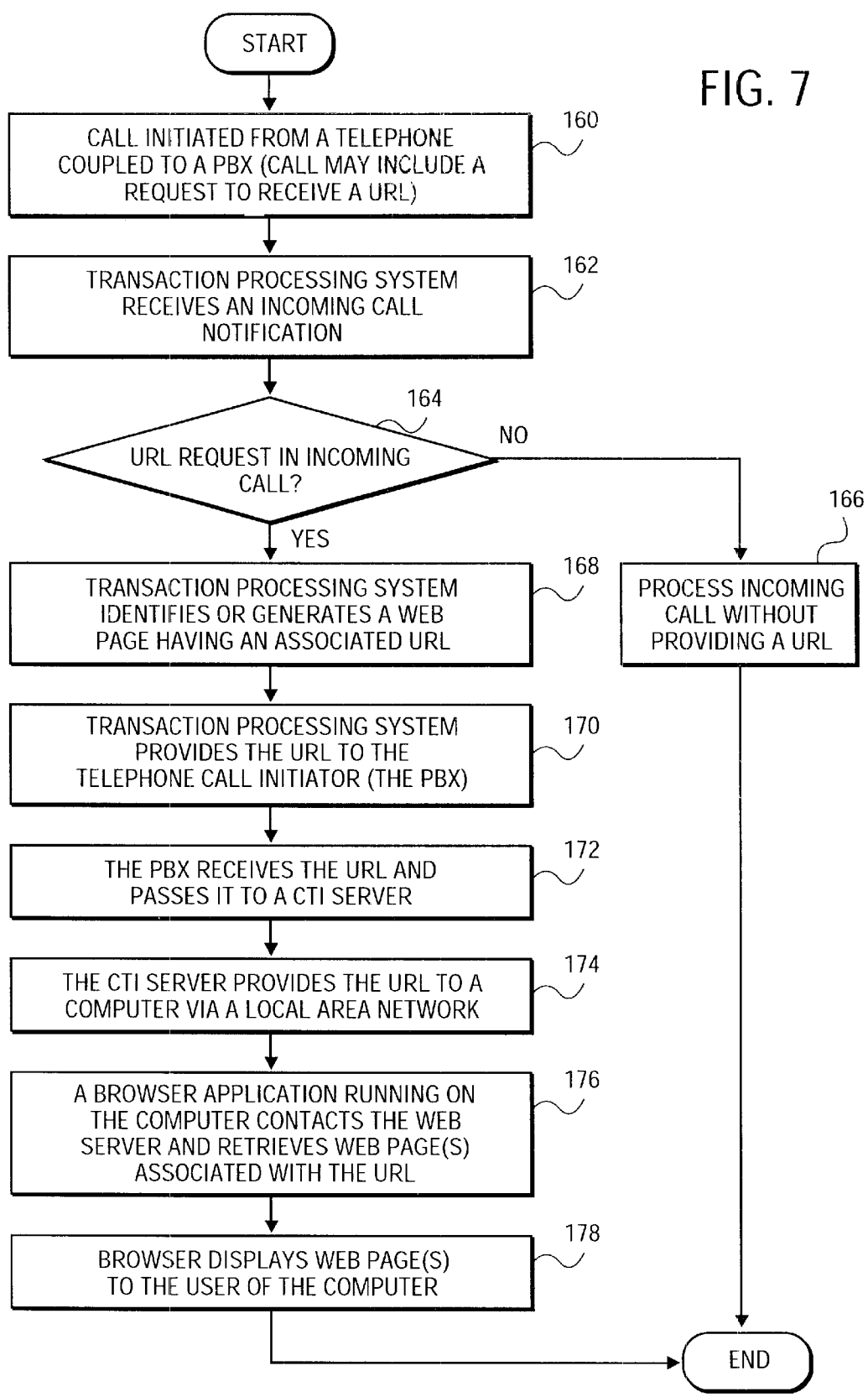

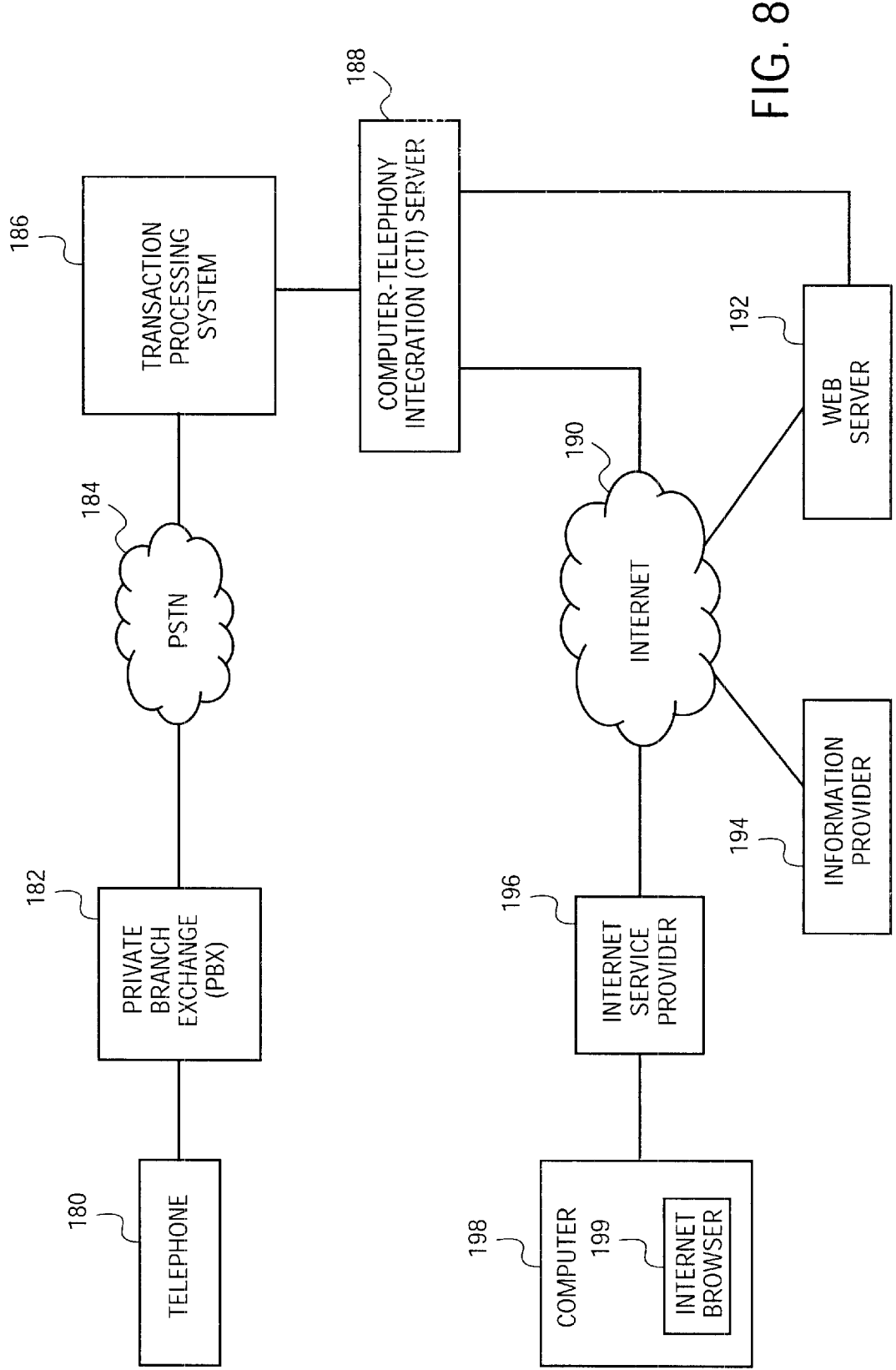

METHOD AND APPARATUS FOR ESTABLISHING COMMUNICATION BETWEEN A TRANSACTION INITIATOR AND A TRANSACTION PROCESSING SYSTEM

FIELD OF THE INVENTION

The present invention relates to a system for communicating information. More specifically, a system is disclosed for communicating information, including visual data, between two devices or individuals, such as a transaction processing system and an initiator of a transaction.

BACKGROUND

Known systems are available for communicating information between two devices, such as a telephone communication system that communicates information between two telephones across a public switched telephone network (PSTN). A telephone allows an individual to contact another individual by dialing a particular telephone number. Once the connection is established, the two individuals communicate by talking to one another. Since most organizations use telephones (including private branch exchanges (PBXs)), and a majority of individual households have at least one telephone, the conventional telephone is an efficient and popular communication system.

In a conventional telephone system, only audible information is exchanged between the two individuals. Thus, the individuals cannot see the other person or exchange any visual information. Using this type of system, an individual calling an organization requesting additional information about a product or service, must rely on audible information (either from a live person or a recorded message). Visual information is not exchanged in a conventional telephone system.

Telephones that incorporate video data with the audible data (commonly referred to as videophones) have been developed. However, these videophones are relatively expensive and require specialized hardware (the videophone) at each end of the telephone communication link. Unless videophones gain increased consumer acceptance, most telephone communications will be limited to conventional telephones exchanging audible data. Furthermore, videophones do not typically permit the transmission of transactional data between the users of the system. For example, a user of a videophone cannot typically transmit data, such as computer-based data, to the other individual or system. The users are generally limited to exchanging information audibly and displaying information or objects to the camera such that an image of the information or object is communicated to the other individual or system.

Existing systems are available for establishing a connection between two individuals across the Internet (commonly referred to as Internet Phones). These Internet Phones allow the communication of both visual data and audible data between the two individuals. Although the popularity and utilization of the Internet is growing quickly, Internet Phones are less convenient than conventional telephones because they require custom software and cannot exchange visual data with a conventional analog telephone. Furthermore, a limited number of individuals and organizations use Internet Phones on a regular basis. A person or organization that does not use an Internet Phone cannot be contacted by another individual or organization using an Internet Phone.

Existing communication systems do not permit the augmenting of a non-visual communication path (e.g., a telephone call) with visual data or transactional data having a defined structure. Existing telephone systems are limited to communicating only non-visual data. Videophones are limited to communicating non-visual data and non-transactional visual data. Videoconferencing systems are also limited to communicating non-visual data and non-transactional visual data.

It is therefore desirable to provide a mechanism that provides a convenient and efficient system for exchanging both transactional data and audible data between two individuals or systems.

SUMMARY OF THE INVENTION

The present invention is related to a system for communicating information, including visual data, between two systems, devices or individuals. For example, embodiments of the present invention are capable of establishing communication between a transaction processing system and an initiator of a transaction.

An embodiment of the invention establishes communication between a transaction initiator and a transaction processing system, in which the transaction processing system has received a transaction from the transaction initiator. An identifier associated with the received transaction is received from the transaction processing system. The transaction initiator is identified based on the identifier associated with the received transaction. A resource locator is then provided to the transaction initiator.

In a particular embodiment of the invention, the resource locator is a uniform resource locator (URL).

Other embodiments of the invention provide the resource locator to the transaction processing system.

Embodiments of the invention determine a network address associated with the transaction initiator and provide the network address to the transaction processing system.

In one embodiment of the invention, the identifier associated with the received transaction is the transaction initiator's telephone number.

In another embodiment of the invention, the identifier associated with the received transaction is the transaction initiator's account number.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 5 is a flow diagram illustrating an embodiment of a procedure for processing transactions using the system of FIG. 4.

FIG. 6 illustrates another embodiment of a communication system capable of implementing the present invention.

FIG. 7 is a flow diagram illustrating an embodiment of a procedure for processing transactions using the system of FIG. 6.

FIG. 8 illustrates an embodiment of a communication system including an information provider that associates URLs with transaction initiators.

DETAILED DESCRIPTION

Figure 1:
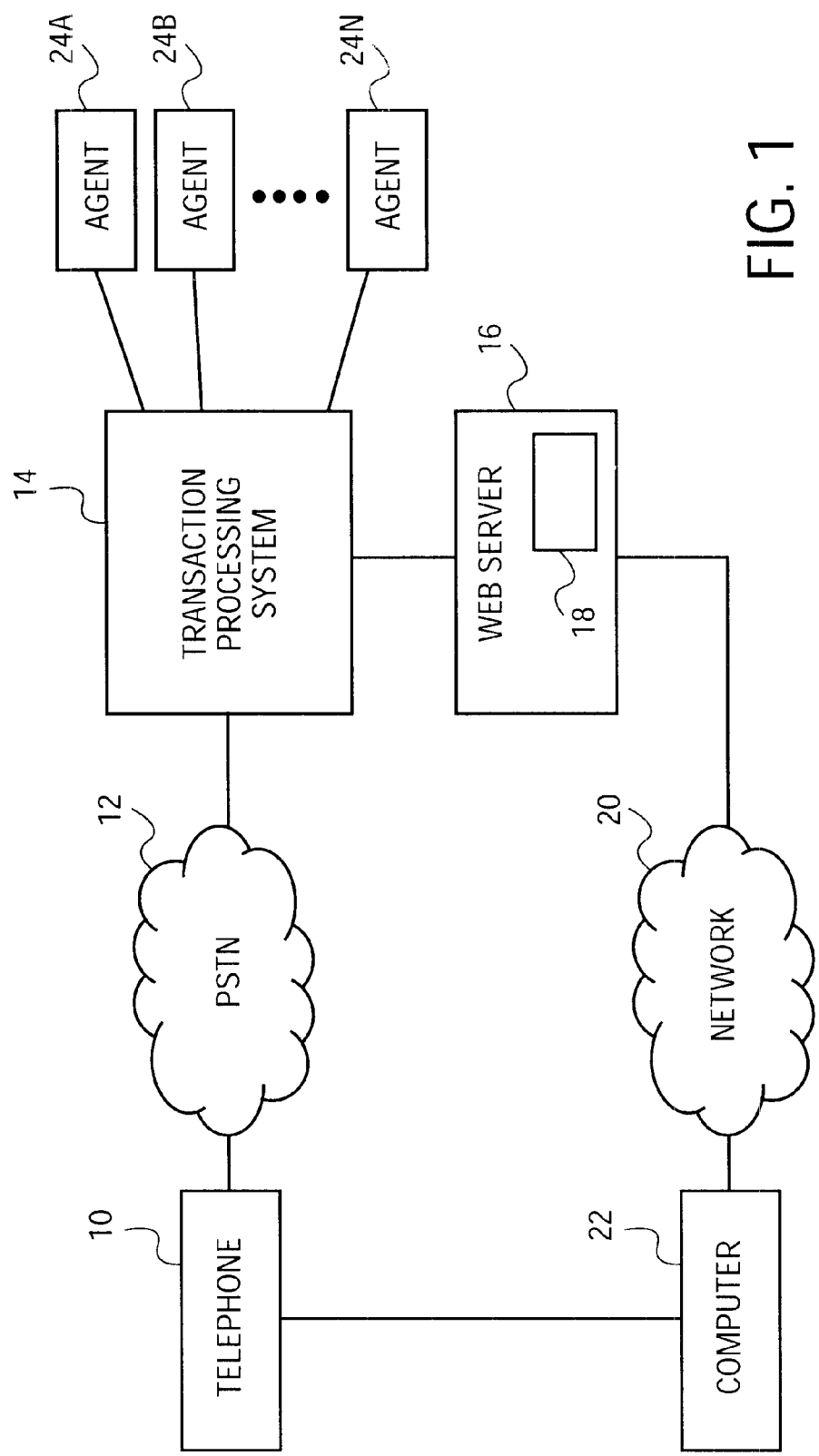
FIG. 1 illustrates an embodiment of a communication system capable of implementing the teachings of the present invention.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention is related to a system for communicating information, including visual data, between two systems, devices or individuals. For example, the present invention is capable of communicating information, including visual data, between a transaction processing system and an initiator of a transaction. In an embodiment of the present invention, the transaction initiator is able communicate with the transaction processing system using a conventional telephone. The transaction processing system provides the transaction initiator with a resource locator, such as a uniform resource locator (URL). The resource locator is used by a computer or other processing device to retrieve information, such as information contained web pages, associated with the resource locator. Thus, the transaction initiator is able to communicate with the transaction processing system using both the conventional telephone (for audible information) and the computer (for visual information). The communication of the resource locator to the user's computer can be performed automatically, such that the process is transparent to the user. Embodiments of the present invention allow the transaction processing system (or an agent coupled to the transaction processing system) to simultaneously illustrate and describe a particular topic or item, without requiring the transaction initiator to use specialized hardware or software. Furthermore, the transaction processing system is capable of exchanging transactional information and other computer-based data with the transaction initiator.

Particular embodiments of the invention are described herein with reference to URLs. A URL is one type of resource locator that may be utilized with the present invention. However, those of ordinary skill in the art will appreciate that the teachings of the present invention can be used with any type of resource locator or other identifier.

Embodiments of the invention allow a telephone caller to request information from an information source in the form of a web page. This information may be provided automatically by the information source or selected by an agent based on the conversation with the telephone caller. Thus, rather than describing a product or service audibly using only the telephone connection, an agent or system is able to display information about the product or service to the caller while continuing to describe the product or service audibly. The invention may also be used in place of an integrated voice response system. Instead of providing the caller with a prerecorded list of options that are selected with the telephone keypad, the caller's computer displays a web page containing the various options, including options to display more information about a product or service.

Particular embodiments of the invention are described below with reference to a transaction processing system. A transaction processing system is any device capable of receiving, transmitting, queuing, routing, or otherwise processing a transaction. A transaction processing system may also handle mixed transactions (e.g., receive a telephone call and respond to the telephone call using electronic mail). Example transaction processing systems include automatic call distributors (ACDs), and other telephone processing devices. A particular transaction can be either inbound or outbound. Exemplary transactions include telephone calls, video sessions, or an Internet session. Although particular embodiments of the invention are described for processing telephone calls, those of ordinary skill in the art will appreciate that the teachings of the invention can be applied to any type of transaction. In particular, the teachings of the present invention may be applied to any type of real-time transaction.

FIG. 1 illustrates an embodiment of a communication system capable of implementing the teachings of the present invention. A telephone 10 is coupled to a public switched telephone network (PSTN) 12. A transaction processing system 14 is also coupled to PSTN 12. Transaction processing system 14 is capable of receiving, transmitting, and processing various types of transactions, such as telephone calls. PSTN 12 may be any type of switching system or data communication network capable of establishing a connection between telephone 10 and transaction processing system 14. Although FIG. 1 shows telephone 10 coupled directly to PSTN 12, in alternate embodiments of the invention telephone 10 part of a private branch exchange (PBX) system, which is coupled to PSTN 12.

A web server 16 is coupled to transaction processing system 14 and maintains multiple web pages identified by URLs, such as web page 18. In FIG. 1, web server 16 is shown coupled directly to transaction processing system 14. However, in alternate embodiments of the invention, web server 16 is indirectly coupled to transaction processing system 14 through a network, such as the Internet, or other communication mechanism. Web server 16 is also coupled to a network 20 (e.g., a local area network (LAN), a wide area network (WAN), the Internet or an intranet network). In a particular embodiment of the invention, web server 16 is contained within transaction processing system 14. Web server 16 may be any device capable of maintaining and distributing web pages. In alternate embodiments, web server 16 can be any device capable of distributing information (e.g., a server capable of distributing information across a network to one or more computers). In particular embodiments of the invention, PSTN 12 and network 20 may be combined in a single network or entity.

A computer 22 is coupled to network 20 and telephone 10. The coupling between computer 22 and telephone 10 may be a physical connection (e.g., a serial communication link) or a logical connection (e.g., through a common interface device coupled to telephone 10, computer 22, and network 20). Computer 22 is capable of communicating information across network 20 and communicating with telephone 10. Although telephone 10 and computer 22 are shown as two separate devices in FIG. 1, in alternate embodiments of the invention, telephone 10 and computer 22 are contained in a single device. Other embodiments of the invention use a software-based telephone implemented by computer 22, thereby eliminating the need for a separate telephone 10. These other embodiments of the invention use a modem contained within computer 22 to initiate and receive telephone calls across PSTN 12. Alternatively, an Internet Phone may be used to establish an audible connection between a transaction initiator and a transaction processing system.

Multiple agents (e.g., telephone agents) 24a, 24b, and 24n are coupled to transaction processing system 14. A particular transaction processing system may have any number of agents capable of handling various transactions. For example, a telephone processing system may use multiple telephone agents, in which each agent has a telephone (or similar device) and a computer. The agent uses the telephone to communicate verbally with the transaction initiator via the PSTN. Additionally, the agent uses the computer to display information about the transaction initiator and determine which web pages are provided to a user (i.e., which web page or pages are associated with the URL provided to the transaction initiator). Although various embodiments of the invention are illustrated and described as using agent interaction, the invention can be implemented without any agent interaction. For example, an automated process may communicate information to the transaction initiator and receive information from the transaction initiator without requiring the interaction of an agent.

For purposes of illustration, FIG. 1 shows a single telephone 10 and a single computer 22 coupled to PSTN 12 and network 20, respectively. However, those of ordinary skill in the art will appreciate that PSTN 12, transaction processing system 14, web server 16, and network 20 can support multiple telephones and computers simultaneously. Furthermore, web server 16 may be coupled to multiple transaction processing systems, thereby maintaining web pages generated and used by multiple transaction processing systems. A particular web page contained in web server 16 can be accessed by multiple computers simultaneously.

Figure 2:
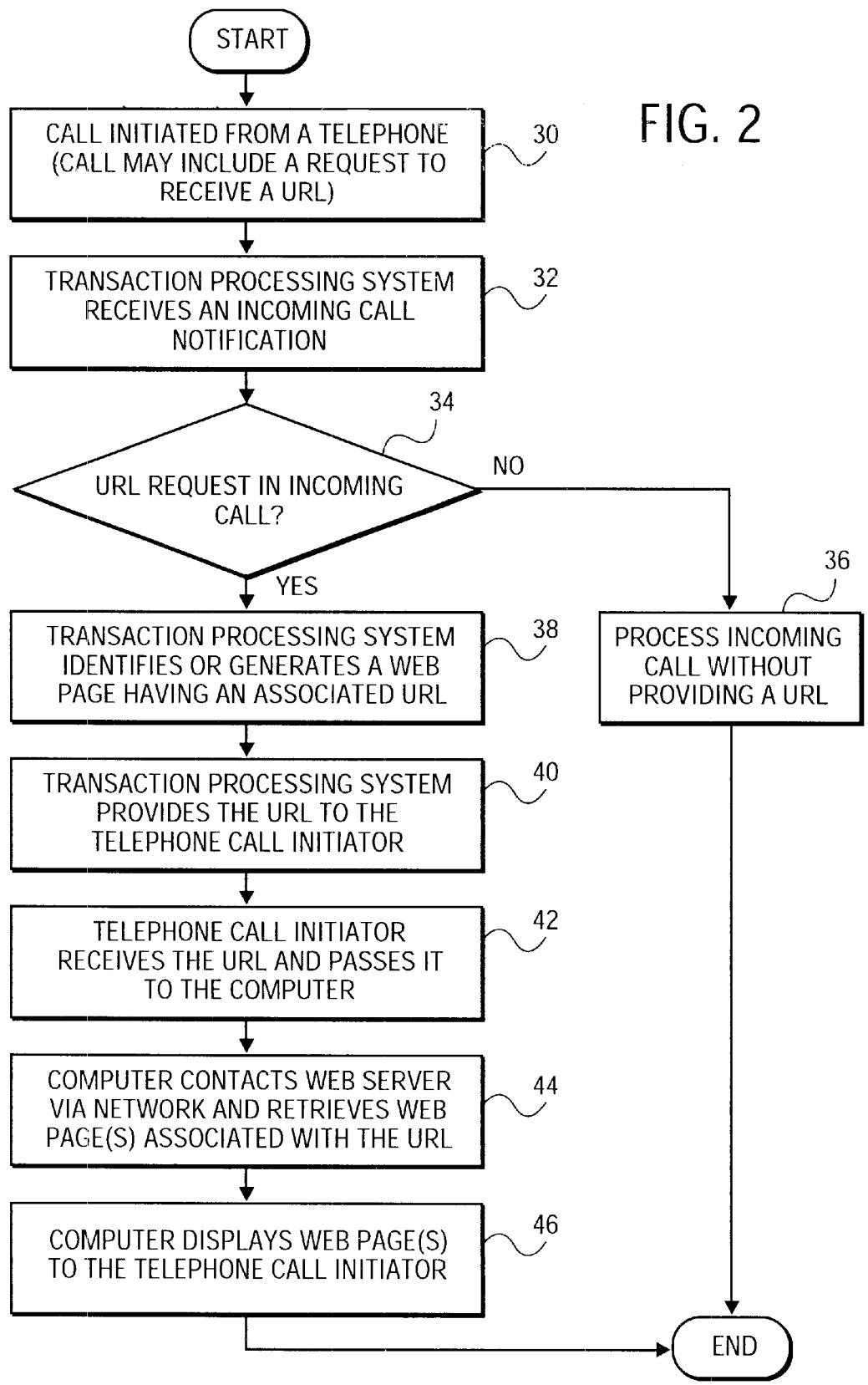
FIG. 2 is a flow diagram illustrating an embodiment of a procedure for processing transactions.

FIG. 2 is a flow diagram illustrating an embodiment of a procedure for processing transactions. At step 30, a call is initiated from a telephone (e.g., telephone 10 in FIG. 1). The call initiated in step 30 may include a request from the call initiator to receive a URL. In the case of a telephone, the call initiator is the user of the telephone. However, in other embodiments, the transaction initiator can be a processing device or an algorithm (e.g., a computer containing a software-based telephone may automatically dial a number associated with a transaction processing system). The request to receive a URL may be a particular message dedicated to requesting URLs or may be part of another call setup message. For example, with an ISDN connection, a new "URL request" message may be created to request a URL from a transaction processing system. Alternatively, a temporary signaling connection may be established between the transaction initiator and the transaction processing system to allow the exchange of various messages. Further, a URL request may be embedded in an existing message, such as the call setup message.

At step 32, a transaction processing system (e.g., transaction processing system 14 in FIG. 1) receives an incoming call notification. This incoming call notification results from the call initiated in step 30. At step 34, the procedure determines whether a URL request was contained in the incoming call. If no URL request was contained in the incoming call, then the procedure branches to step 36 to process the incoming call without providing a URL to the call initiator. Thus, step 36 processes the incoming call in a conventional manner, for example, by providing the call to a telephone agent or playing a recorded message to the call initiator.

If step 34 of FIG. 2 identifies a URL request in the incoming call, then the procedure continues to step 38, where the transaction processing system identifies or generates a web page having an associated URL. The URL is associated with the incoming call, thereby associating the web page with the incoming call. The web page identified or generated at step 38 can be based on the call initiator's telephone number, and may be unique to the call initiator. Alternatively, a particular URL may be associated with multiple incoming calls or multiple call initiators (e.g., multiple callers may view the same web page). For example, the transaction processing system can maintain a database of call initiators (e.g., customers of an organization). This database may contain additional information about a particular call initiator, such as account information or prior purchases. This additional information can be used to select a type or category of web page (e.g., a particular product advertisement or other information likely to be of interest to the caller). At step 40, the transaction processing system provides the URL to the telephone call initiator (e.g., via PSTN 12 in FIG. 1).

At step 42, the telephone call initiator receives the URL from the transaction processing system and passes the URL to a computer coupled to the initiator's telephone. For example, in the embodiment of FIG. 1, the URL is received by the initiator's telephone 10 and automatically passed to computer 22 coupled to telephone 10. Embodiments of the invention allow the telephone to directly communicate the URL to the computer across a communication link. In other embodiments, an interface device is coupled to the telephone, the computer, and one or more networks. The interface receives signals from the network(s) and communicates the signals to the telephone or the computer, as appropriate. Thus, the interface communicates a received URL to the computer and communicates telephony signals to the telephone.

At step 44, the caller's computer contacts a web server via a network (e.g., the Internet) and retrieves one or more web pages associated with the URL provided by the transaction processing system. Various types of software applications, such as web browsers, may be used to retrieve web pages from a web server. The caller's computer may be configured such that a web browser is automatically executed in response to the receipt of a URL from the caller's telephone, thereby automatically retrieving the web pages associated with the received URL. At step 46, the computer displays the web pages retrieved from the web server to the telephone call initiator. At this point, both an audible connection (via the PSTN) and a data connection (via the network) have been established between the call initiator and the transaction processing system. Thus, the call initiator can communicate verbally with an agent of the transaction processing system using the telephone while simultaneously retrieving visual information in the form of web pages.

In a particular embodiment of the invention, the transaction processing system always provides a URL to the telephone that initiated the telephone call. If the telephone is capable of receiving and utilizing a URL, then the call initiator can view the web page associated with the URL. However, if the telephone is incapable of receiving a URL or the call initiator is not interested in viewing the web page, then the URL is ignored or discarded by the telephone that initiated the call. Therefore, in this embodiment, the telephone or device initiating the call is not required to request a URL.

In other embodiments of the invention, the transaction processing system identifies the telephone number, account number, or other identifier associated with a received call. Based on information known about the call initiator, the transaction processing system determines whether to automatically provide a URL to the call initiator. For example, customers of an organization operating the transaction processing system may notify the organization that they have the capability to receive and utilize a URL. The organization maintains a table of such customers based on the customer's telephone number, account number, or other identifying information. If the transaction processing system receives a call from a customer listed in the table, then the transaction processing system automatically provides a URL to the customer. Thus, the customer does not need to request a URL each time a call is placed to the organization.

The flow diagram of FIG. 2 illustrates a procedure for retrieving one or more web pages from a web server based on a URL provided to the telephone call initiator from a transaction processing system. In a particular embodiment of the invention, the web page associated with the URL provided by the transaction processing system is dynamic; i.e., the information contained in the web page(s) may be changed or updated by the transaction processing system. In this situation, the browser or other software application used by the computer to retrieve web pages from the web server may continually check the web server for changes or updates to the web page. In this manner, the web page displayed to the telephone call initiator is dynamic, and changes to reflect, for example, the topic currently being discussed with a telephone agent using the transaction processing system.

When the transaction processing system receives a request from a telephone caller for a URL (or otherwise determines that the caller can receive URLs), the transaction processing system may generate a custom web page for the caller having a unique URL. That URL is provided to the caller, thereby allowing the caller to view the custom web page on the caller's computer. The custom web page may contain, for example, information regarding the caller's account balance or information regarding pricing and availability of various products of interest to the caller. The custom web page may be generated temporarily for use during the telephone call and deleted when the call is terminated. Alternatively, the custom web page can be maintained in the web server after the telephone call has ended, thereby allowing the caller to access the information contained in the web page at a later time. The web server can be configured to automatically purge web pages after a particular time period (e.g., two days after the web page was last accessed).

An exemplary use of the invention allows a telephone caller to request information from an information source in the form of a web page. In this example, the telephone caller initiates a call to a telephone number associated with a transaction processing system or other information source. The transaction processing system provides a URL to the telephone caller. The web page associated with the URL contains information requested by the caller. For example, the transaction processing system may allow the caller to select information using voice commands or commands entered through the telephone keypad. The selected information is then displayed to the user in one or more web pages.

Another embodiment of the invention allows a telephone agent using a transaction processing system to generate or identify web pages for viewing by the caller. For example, the caller and the telephone agent may be discussing a particular product of interest to the caller. Rather than describing the product audibly using only the telephone connection, the agent is able to display a picture of the product to the caller and further describe the product's features audibly as the caller views the web page. The agent may select several different web pages for viewing by the caller, in which each web page displays a different feature of the product.

Other embodiments of the invention are used when a telephone caller is placed on hold by the transaction processing system. For example, a telephone caller initiates a call to a catalog sales department. If all telephone agents are busy with other customers, the caller is placed on hold. While on hold, web pages are displayed to the caller (the web pages are associated with a URL provided to the caller, as discussed above). If the transaction processing system is capable of identifying the caller (e.g., using the caller's phone number), the system may select or generate web pages containing information likely to be of interest to the caller. In addition to the information contained in the web pages, the caller may receive an audible message through the telephone that further describes the information contained in the web page being viewed by the caller.

A further embodiment of the invention permits the caller to provide information to the transaction processing system using the web page. For example, if a user is placed on hold, the transaction processing system may prompt the user to provide various information (e.g., name, account number, or the reason for the call) through the web page instead of a keypad. The user enters information on the web page using a computer keyboard, voice recognition system, or other user input mechanism. The information provided can be used by the transaction processing system to route the caller to a particular agent or group of agents that are familiar with the caller or familiar with the reason for the call.

The present invention can also be used to provide an alternate contact mechanism if the transaction processing system (or its agents) are busy. In this situation, the telephone caller is provided with an option to contact the called agent by sending an e-mail, sending a fax, or paging a particular agent or group of agents. These alternate contact mechanisms can be implemented automatically for the caller. For example, if the user chooses to send an e-mail to a particular agent, the user can enter the e-mail message on the web page, and an e-mail application executed by the web server or the transaction processing system automatically generates and sends an e-mail message to the particular agent.

In certain situations, a transaction processing system may receive an incoming call notification, but may not be capable of accepting the call for processing (e.g., all agents are already busy and all queues are full). If a particular call cannot be accepted, then the transaction processing system may provide a URL to the caller without answering the call. The web page associated with the URL informs the caller that the system is unable to answer the call, and provides the user with alternate options (e.g., leave an e-mail message, request that an agent call the user, or browse web pages containing information about the organization called by the caller). Since the transaction processing system does not answer the incoming call, no connect charges are incurred because no connection was established. Typically, these connect charges are incurred by the operator of the transaction processing system that provides a toll-free number used by callers.

Particular embodiments of the invention are discussed in which a request receive a URL is generated by a telephone used by a call initiator. However, in alternate embodiments of the invention, a request to receive a URL may be generated by any device or system. For example, in the configuration of FIG. 1, a device within PSTN 12 may generate the request to receive a URL. Alternatively, any other device capable of communicating with the transaction processing system may be used to generate a request to receive a URL.

Figure 3:
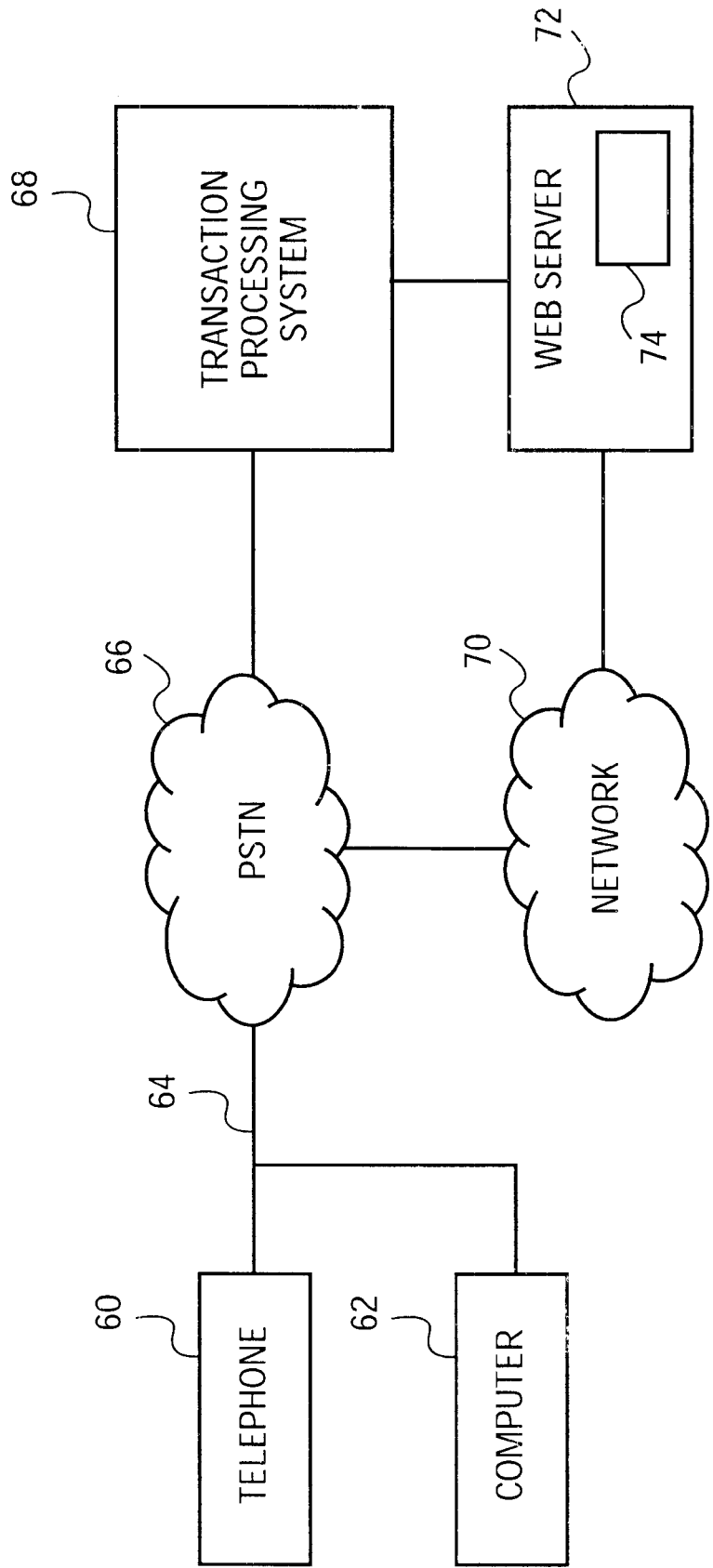
FIG. 3 illustrates another embodiment of a communication system capable of implementing the teachings of the present invention.

FIG. 3 illustrates another embodiment of a communication system capable of implementing the teachings of the present invention. The embodiment of FIG. 3 uses an Integrated Services Digital Network (ISDN) line 64 for communications between a caller and a transaction processing system. A telephone 60 and a computer 62 are coupled to ISDN line 64. ISDN line 64 communicates information between telephone 60, computer 62, and a transaction processing system 68 using PSTN 66. A network 70 (i.e., the Internet or an intranet network) is coupled to PSTN 66. A web server 72 is coupled to transaction processing system 68 and network 70. Web server 72 contains one or more web pages 74 for distribution across network 70. The particular web pages maintained by web server 72 may be generated or edited by transaction processing system 68, and then provided to web server 72. In the embodiment of FIG. 3, a separate communication line from computer 62 to network 70 is not required because ISDN line 64 is capable of handling both analog voice data from telephone 60 and the digital data communicated between computer 62 and web server 72. Although not shown in FIG. 3, transaction processing system 68 may include any number of agents for handling various transactions.

In the system of FIG. 3, a telephone call is initiated by telephone 60 and received by transaction processing system 68 via PSTN 66. If the incoming call (received by transaction processing system 68) includes a request to receive a URL, then transaction processing system 68 identifies or generates a web page having an associated URL. This URL is associated with the incoming call and provided to the telephone call initiator via PSTN 66 (using ISDN line 64). Telephone 60 receives the URL and passes it to computer 62. Computer 62 then contacts web server 72 via PSTN 66 and network 70, and retrieves one or more web pages associated with the URL. The retrieved web pages are then displayed to the user of the computer (e.g., the telephone call initiator).

Figure 4:
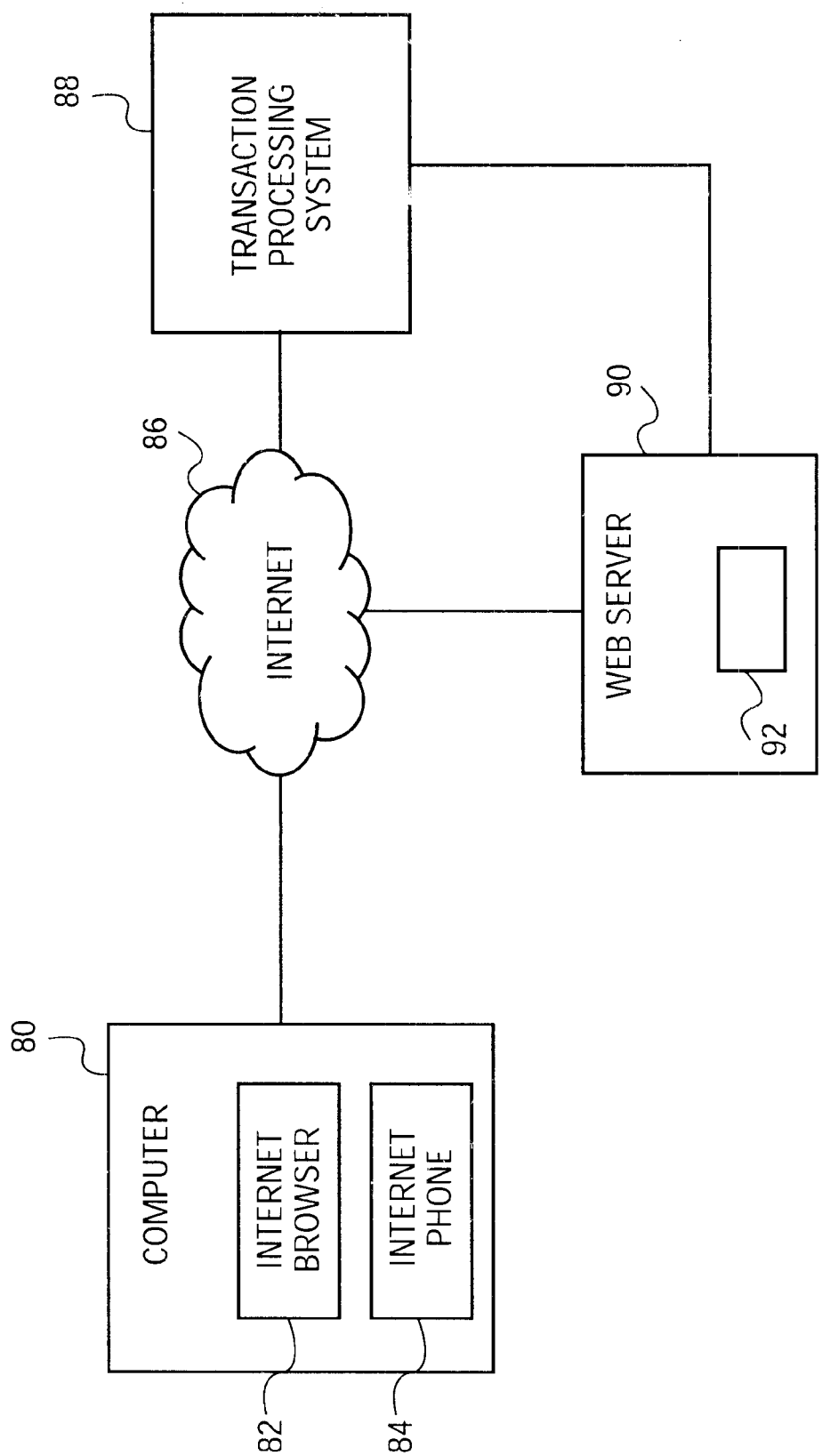
FIG. 4 illustrates an embodiment of a communication system capable of implementing the present invention using an Internet phone.

FIG. 4 illustrates an embodiment of a communication system capable of implementing the present invention using an Internet phone. A computer 80 includes an Internet browser application 82 and an Internet phone application 84. Internet browser 82 can be any type of browser capable of the retrieving and displaying web pages from the Internet. Similarly, Internet phone 84 can be any type of Internet-based telephone application capable of the establishing a connection across the Internet to a transaction processing system 88. Transaction processing system 88 can include any number of agents for handling various transactions. Transaction processing system 88 is coupled to Internet 86 and to a web server 90, which maintains one or more web pages 92. In an alternate embodiment of the invention, transaction processing system 88 is not directly coupled to web server 90. Instead, transaction processing system 88 and web server 90 communicate with one another using Internet 86. In alternate embodiments of the invention, the system illustrated in FIG. 4 may use an ISDN phone embedded in computer 80. In this embodiment, the ISDN phone replaces Internet phone 84.

FIG. 5 is a flow diagram illustrating an embodiment of a procedure for processing transactions. The procedure illustrated in FIG. 5 may be used in connection with the configuration shown in FIG. 4. At step 100, a call is initiated from an Internet phone running on a computer (e.g., Internet phone 84 running on computer 80). The initiated call may include a request to receive a URL. At step 102, the transaction processing system receives an incoming call notification via the Internet. At step 104, the procedure determines whether a URL was requested in the incoming call. If no URL was requested, then the procedure branches to step 106 to process the incoming call without providing a URL to the call initiator.

If a URL request was contained in the incoming call, then the procedure continues to step 108, where the transaction processing system identifies or generates a web page having an associated URL. At step 110, the transaction processing system provides the URL to the call initiator (in the example of FIG. 4, to computer 80). At step 112, and Internet browser running on the computer contacts the web server and retrieves one or more web pages associated with the URL. At step 114, the Internet browser displays the web pages to the user of the computer.

In the embodiment of FIG. 4, a single communication link between computer 80 and Internet 86 may be sufficient to handle both the Internet telephone call and the retrieval of web pages from web server 90. Thus, the user of computer 80 does not require two separate telephone lines to establish both a voice connection for audible data and data connection for communicating web page data.

FIG. 6 illustrates another embodiment of a communication system capable of implementing the present invention. A telephone 130 is coupled to a private branch exchange (PBX) 132, which is coupled to a PSTN 134. Although a single telephone 130 is shown in FIG. 6, any number of telephones can be coupled to PBX 132. Various signals are communicated between PBX 132 and a transaction processing system 136 using PSTN 134. Transaction processing system 136 is coupled to a web server 138, which contains multiple web pages 140. Web server 138 is coupled to a network 142, such as the Internet or an intranet network. In an alternate embodiment of the invention, transaction processing system 136 is also coupled to network 142, thereby allowing transaction processing system 136 to communicate directly with network 142, rather than through web server 138. As discussed above, transaction processing system 136 is capable of generating and editing web pages maintained by web server 138. Additionally, transaction processing system 136 may include any number of agents (not shown) capable of handling various transactions.

Network 142 is coupled to a local area network (LAN) 144. LAN 144 may be any type of network, such as a corporate LAN or an intranet. LAN 144 it is coupled to a Computer-Telephony Integration (CTI) server 146. CTI server 146 receives telephony signals generated by PBX 132 and communicates the signals to LAN 144. Additionally, CTI server 146 is capable of receiving signals from LAN 144 and providing the signals in a telephony format to PBX 132. A computer 148 is coupled to LAN 144 and includes a browser application 150. Although FIG. 6 illustrates a single computer 148 coupled to LAN 144, embodiments of the invention typically contain multiple computers coupled to a LAN. Browser application 150 may be any type of application capable of retrieving web pages from a web server (e.g., an Internet browser where network 142 is the Internet). In the embodiment shown in FIG. 6, no direct link is required between telephone 130 and computer 148. Instead, the necessary communications between telephone 130 and computer 148 are provided through PBX 132, CTI server 146, and LAN 144.

FIG. 7 is a flow diagram illustrating an embodiment of a procedure for processing transactions using the system of FIG. 6. At step 160, a call is initiated from a telephone coupled to a PBX (e.g., telephone 130 coupled to PBX 132). The call initiated at step 160 may include a request to receive a URL. At step 162, the transaction processing system receives an incoming call notification. At step 164, the procedure determines whether a URL request was contained in the incoming call. If a URL request was not contained in the incoming call, the procedure branches to step 166, where the incoming call is processed without providing a URL to the call initiator. If a URL request was contained in the incoming call, the procedure continues from step 164 to step 168, where the transaction processing system identifies or generates a web page having an associated URL. This URL is associated with the telephone call initiator. At step 170, the transaction processing system provides the URL to the telephone call initiator (e.g., PBX 132 in FIG. 6). At step 172, the PBX receives the URL and passes it to a CTI server (e.g., CTI server 146 in FIG. 6). At step 174, the CTI server provides the URL to a computer via a local area network. At step 176, a browser application running on the computer contacts the web server and retrieves one or more web pages associated with the URL. At step 178, the browser displays the retrieved web pages to the user of the computer (e.g., the telephone call initiator).

FIG. 8 illustrates an embodiment of a communication system including an information provider that associates URLs with transaction initiators. A telephone 180 is coupled to a PBX 182, which is coupled to a PSTN 184. In alternate embodiments of the invention, telephone 180 is coupled directly to PSTN 184, as illustrated and discussed above. A transaction processing system 186 is coupled to PSTN 184 and communicates with telephone 180 using PSTN 184. Although not shown, transaction processing system 186 may include any number of agents to handle various transactions. Transaction processing system 186 is coupled to a CTI server 188, which is coupled to a web server 192 and the Internet 190. Web server 192 contains multiple web pages that may be generated or edited by transaction processing system 186.

An information provider 194 is also coupled to Internet 190. As discussed in greater detail below, information provider 194 is used to associate URLs, network addresses, or other identifiers with a transaction initiator. In an alternate embodiment of the invention, information provider 194 is coupled directly to transaction processing system 186. In another embodiment of the invention, the functions provided by information provider 194 are incorporated into transaction processing system 186.

A computer 198 is coupled to an Internet Service Provider 196, which is coupled to Internet 190. In an alternate embodiment of the invention, computer 198 is coupled to Internet 190 without the use of an Internet Service Provider. Computer 198 includes an Internet browser 199 capable of retrieving web pages from web server 192. As shown in FIG. 8, no direct connection is provided between telephone 180 and computer 198. Further, no direct communication link is provided between PBX 182 and computer 198. As discussed below, telephone 180 and PBX 182 have no direct method for providing a URL to computer 198. Instead, the association of a URL with a transaction initiator is provided by information provider 194 in combination with information received from transaction processing system 186. Information provider 194 maintains a registry of transaction initiators, including a unique identifier associated with each transaction initiator, and an associated network address of the computer used by the transaction initiator. In other embodiments, computer 198 includes a separate client process that interacts with the system that handles the registration process (e.g., information provider 194). In this embodiment, each time the user of computer 198 logs onto the Internet (and is therefore able to receive data or access data across the Internet), the client process automatically notifies information provider 194. Similarly, when the user logs out, the client process automatically notifies information provider 194. Thus, information provider 194 knows when the user is available to receive information or access information across the Internet (e.g., receive information or access information from transaction processing system 186).

Figure 9A:
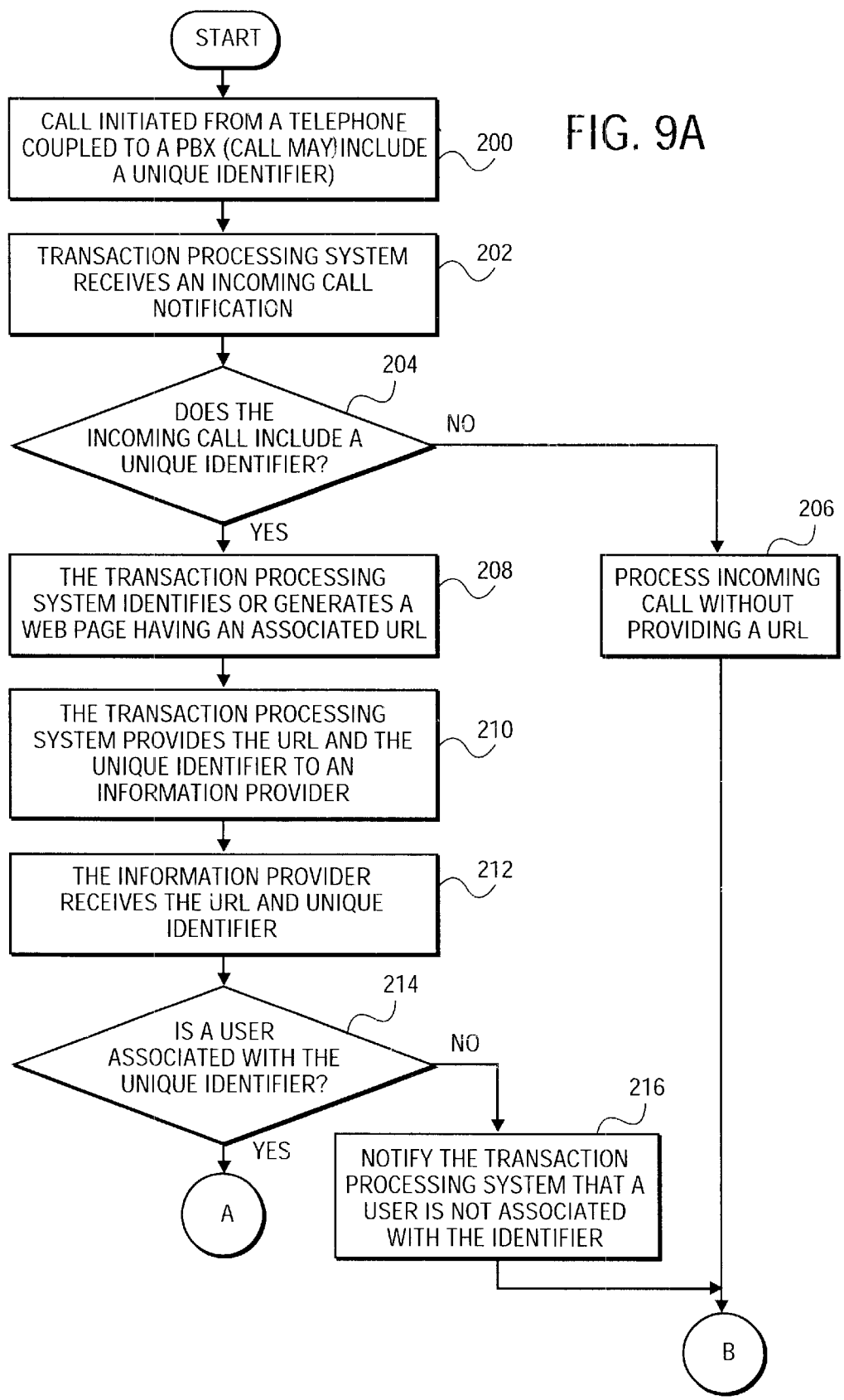
FIGS. 9A and 9B represent a flow diagram illustrating an embodiment of a procedure for processing transactions using the system of FIG. 8.
Figure 9B:
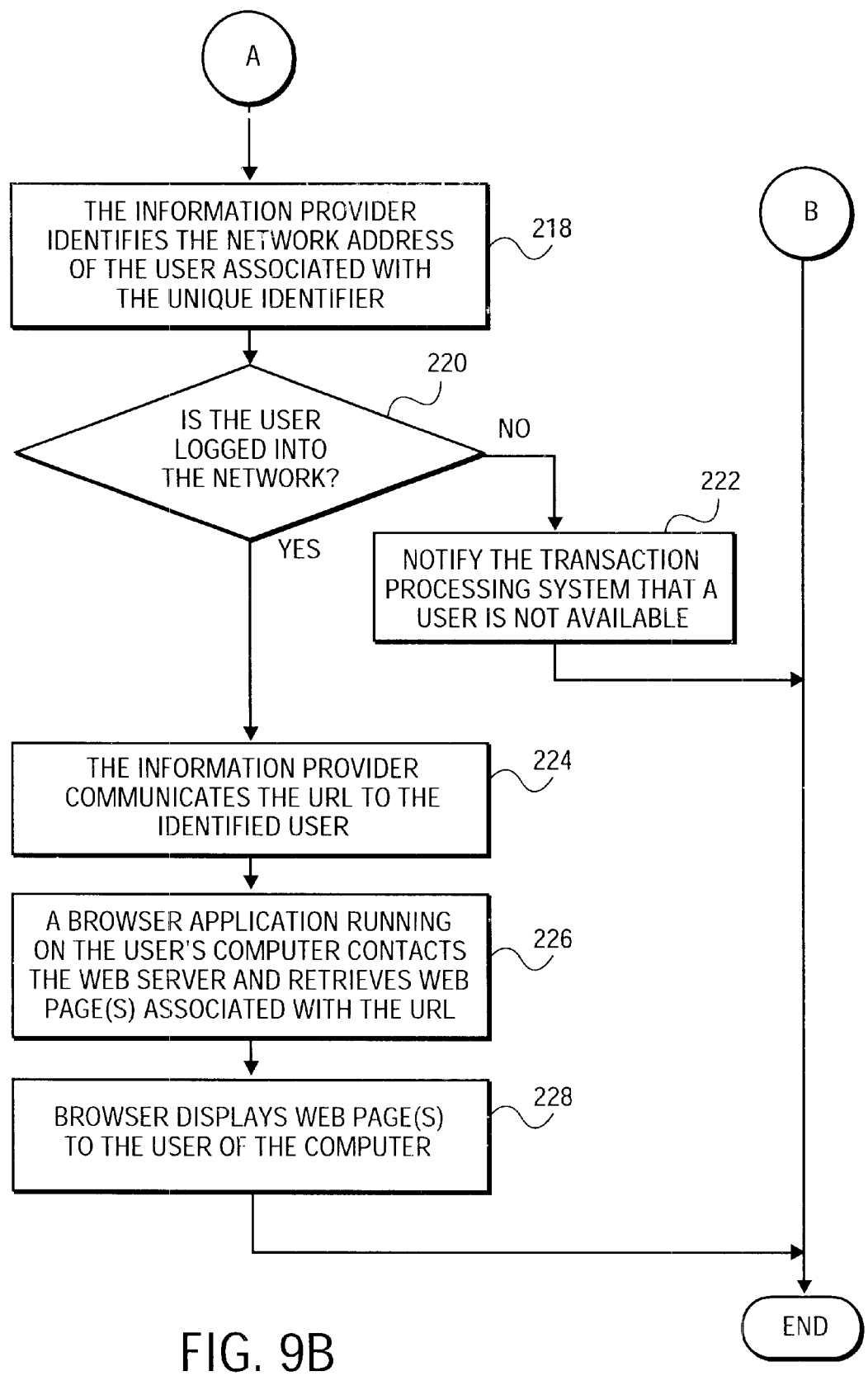

FIGS. 9A and 9B represent a flow diagram illustrating an embodiment of a procedure for processing transactions using the system of FIG. 8. At step 200, a call is initiated from a telephone coupled to a PBX (e.g., telephone 180 coupled to PBX 182 in FIG. 8). The call may include a unique identifier, such as a phone number, account number, or other identification code. At step 202, the transaction processing system receives an incoming call notification. Step 204 determines whether the incoming call includes a unique identifier. If a unique identifier is not included in the incoming call, the procedure branches to step 206 where the incoming call is processed without providing a URL to the transaction initiator. If the incoming call includes a unique identifier, the procedure continues from step 204 to step 208, where the transaction processing system identifies or generates a web page having an associated URL. At step 210, the transaction processing system provides the URL and the unique identifier to an information provider (e.g., information provider 194 in FIG. 8). In step 212, the information provider receives the URL and the unique identifier. Step 214 determines whether a user (transaction initiator) is associated with the unique identifier. Additional details regarding the identification of a particular user associated with the unique identifier are provided below. If a user is not associated with the unique identifier, the procedure branches to step 216 and notifies the transaction processing system that the user is not associated with the identifier. At this point, the transaction processing system may handle the incoming call using only a voice connection via a PSTN.

If step 214 of FIG. 9A determines that a user is associated with the unique identifier, then the procedure continues to step 218 (FIG. 9B), where the information provider identifies the network address of the user associated with the unique identifier. At step 220, the procedure determines whether the identified user is logged into the network. This determination, as discussed in greater detail below, may be performed by searching for the user's network address or by performing a query of the appropriate Internet Service Provider. If the user is not logged into the network, then the procedure branches to step 222 to notify the transaction processing system that the user is not available. In this situation, the transaction processing system handles the incoming call using only a voice connection across the PSTN. However, if the user is logged into the network, then the procedure continues from step 220 to step 224, where the information provider communicates the URL to the identified user. The URL can be communicated to user's network address, which may be processed by an Internet Service Provider. At step 226, a browser application running on the user's computer contacts the web server and retrieves one or more web pages associated with the URL. At step 228, the browser displays the web pages to the user of the computer (e.g., the telephone call initiator).

Figure 10:
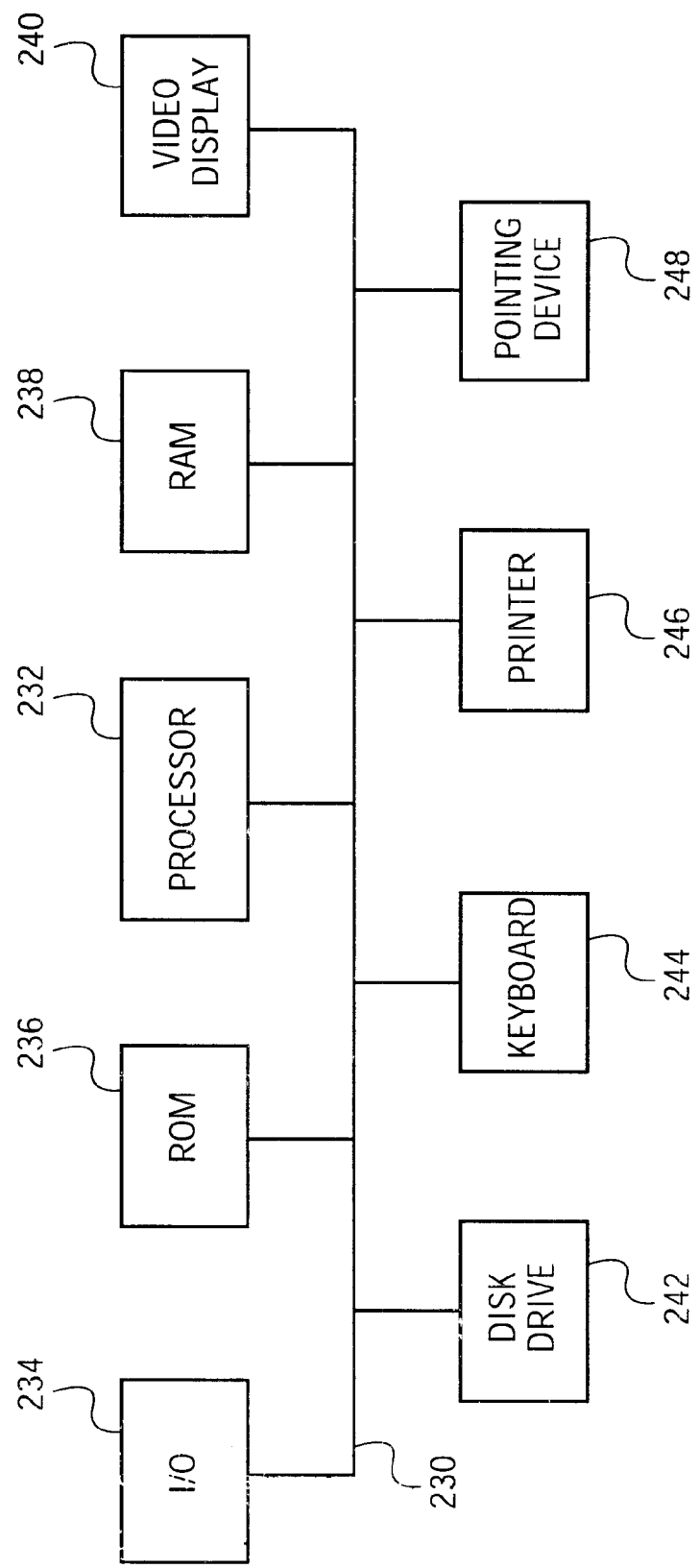
FIG. 10 illustrates an embodiment of a computer system that can be used with the present invention.

FIG. 10 illustrates an embodiment of a computer system that can be used with the present invention. For example, embodiments of the invention may use a computer of the type shown in FIG. 10 for the transaction processing system, CTI server, web server, information provider, or the computer shown in the various communication systems discussed above. The various components shown in FIG. 10 are provided by way of example. Certain components of the computer in FIG. 10 can be deleted for particular implementations of the invention. The computer shown in FIG. 10 may be any type of computer including a general purpose computer.

FIG. 10 illustrates a system bus 230 to which various components are coupled. A processor 232 performs the processing tasks required by the computer. Processor 232 may be any type of processing device capable of implementing the steps necessary to perform the various procedures and operations discussed above. An input/output (I/O) device 234 is coupled to bus 230 and provides a mechanism for communicating with other devices coupled to the computer. A read-only memory (ROM) 236 and a random access memory (RAM) 238 are coupled to bus 230 and provide a storage mechanism for various data and information used by the computer. Although ROM 236 and RAM 238 are shown coupled to bus 230, in alternate embodiments, ROM 236 and RAM 238 are coupled directly to processor 232 or coupled to a dedicated memory bus (not shown).

A video display 240 is coupled to bus 230 and displays various information and data to the user of the computer. A disk drive 242 is coupled to bus 230 and provides for the long-term mass storage of information. A keyboard 244 and pointing device 248 are also coupled to bus 230 and provide mechanisms for entering information and commands to the computer. A printer 246 is coupled to bus 230 and is capable of creating a hard-copy of information generated by or used by the computer.

Embodiments of the present invention may be implemented using a computer-readable medium (also referred to as a processor-readable medium) containing various sets of instructions, code sequences, configuration information, and other data used by a computer or other processing device. The information stored on the computer-readable medium is used to perform various data communication, data processing, and data handling operations, such as those described above. The computer-readable medium can be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method to establish communications between a transaction initiator and a transaction processing system, a method including:
    establishing a transaction between the transaction initiator and the transaction processing system, the transaction capable of supporting both voice and data communications between the transaction initiator and the transaction processing system;
    receiving an identifier associated with the transaction at the transaction processing system, wherein the identifier is received automatically by the transaction processing system as a data communication and without prompting from the transaction initiator;
    identifying the transaction initiator based on the identifier associated with the transaction; and
    automatically providing a resource locator from the transaction processing system to the transaction initiator responsive to the identification of the transaction initiator,
    wherein the resource locator identifies a resource that is selected based on the identification of the transaction initiator.

2. The method of claim 1 wherein the transaction constitutes an Internet session capable of handling both voice data and digital data.

3. The method of claim 2 wherein the transaction is established over an ISDN line.

4. The method of claim 1 wherein the transaction initiator initiates the transaction utilizing a voice communication system.

5. The method of claim 4 wherein the voice communication system comprises an Internet telephone to receive the resource locator.

6. The method of claim 5 wherein the Internet telephone comprises a stand-alone unit, coupled a computer system.

7. The method of claim 6 wherein the Internet telephone is to communicate the resource locator to the computer system, the computer system to retrieve the resource identified by the resource locator.

8. The method of claim 5 wherein Internet telephone is implemented as an application executing on a computer system.

9. The method of claim 1 wherein the identifier associated with the transaction is received at the transaction processing system as a message dedicated to requesting the resource locator.

10. The method of claim 1 wherein the identifier associated with the transaction is received at the transaction processing system as part of a call setup message.

11. The method of claim 1 wherein the identifier associated with the transaction is received as part of a temporary signaling connection establish between the transaction initiator and the transaction processing system to facilitate an exchange of messages.

12. The method of claim 1 including, at the transaction processing system, determining whether the transaction initiator is capable of receiving the resource locator and of retrieving a resource identified by the resource locator via a network connection.

13. The method of claim 12 wherein the determination includes determining whether the transaction initiator is currently logged onto the Internet.

14. The method of claim 12 wherein the determining includes identifying any one of a group of information items concerning the transaction initiator, the group of information items including a telephone number, an account number, or other identifier associated with the transaction.

15. The method of claim 12 wherein the determining includes comparing the identifier associated with the transaction to a table of identifiers associated with customers serviced by the transaction processing system to determine whether the transaction initiator is a customer.

16. The method of claim 1 wherein the resource identified by the resource locator comprises a custom web page customized for the transaction initiator.

17. The method of claim 16 wherein the custom web page includes information concerning an account of the transaction initiator.

18. The method of claim 16 wherein the custom web page includes information likely to be of interest to the transaction initiator.

19. The method of claim 18 wherein the information likely to be of interest is a product advertisement.

20. The method of claim 18 wherein the information likely to be of interest includes pricing information regarding products that are likely to be of interest to the transaction initiator.

21. The method of claim 18 wherein the information likely to be of interest includes product availability information regarding products that are likely to be of interest to the transaction initiator.

22. The method of claim 1 wherein the resource identified by the resource locator comprises a web page identified by an agent associated with the transaction processing system for viewing by the transaction initiator.

23. The method of claim 22 wherein the web page identified by the agent pertains to a product regarding which the agent and the transaction initiator have exchanged voice communications.

24. The method of claim 1 wherein the resource locator is automatically provided from the transaction processing system to the transaction initiator prior to an establishment of voice communications between the transaction initiator and the transaction processing system.

25. The method of claim 24 wherein the resource identified by the resource locator comprises a web page informing the transaction initiator that the transaction processing system is unable to establish voice communications with the transaction initiator.

26. The method of claim 25 wherein the web page informs the transaction initiator of alternative communication options.

27. The method of claim 1 wherein the transaction is capable of supporting both analog voice data from a telephone and digital data from a computer for communication to the transaction processing system.

28. The method of claim 1 wherein the transaction comprises a single communication link between the transaction initiator to handle both an Internet telephone call and the retrieval of web pages from the transaction processing system.

29. The method of claim 1 wherein the resource locator is a uniform resource locator (URL).

30. The method of claim 1 including determining a network address associated with the transaction initiator, and communicating the network address to the transaction processing system.

31. The method of claim 1 wherein the identifier associated with the transaction is a telephone number of the transaction initiator.

32. The method of claim 1 wherein the identifier associated with the transaction is an account number of the transaction initiator.

33. A method to facilitate communications between a transaction initiator and a transaction processing system, a method including:
   establishing a transaction between the transaction initiator and the transaction processing system;
   receiving an identifier associated with the transaction at the transaction processing system as part of the establishment of the transaction, and as provided by the transaction initiator without prompting from the transaction processing system;
   identifying the transaction initiator based on the identifier associated with the transaction; and
   automatically providing a resource locator from the transaction processing system to the transaction initiator responsive to the identification of the transaction initiator, wherein the resource locator identifies a custom resource that is customized for the transaction initiator, based on the identification of the transaction initiator.

34. The method of claim 33 wherein the custom resource comprises a web page including information selected based on the identification of the transaction initiator.

35. The method of claim 34 wherein the selected information includes any one of a group of information items including an account balance and product information concerning a product in which the transaction initiator most likely has an interest.

36. The method of claim 33 wherein the automatic provision of the resource locator from the transaction processing system to the transaction initiator includes determining whether the transaction initiator is capable of retrieving the custom resource.

37. The method of claim 33 wherein the determining includes identifying whether the transaction initiator is a customer of an organization serviced by the transaction processing system.

38. A system to establish communications with a transaction initiator, a system comprising:
   first means for establishing a transaction between the transaction initiator and the transaction processing system, the transaction capable of supporting both voice and data communications between the transaction initiator and the transaction processing system;
   second means for receiving an identifier associated with the transaction at the transaction processing system, wherein the identifier is received automatically by the second means as a data communication, without prompting;
   third means for identifying the transaction initiator based on the identifier associated with the transaction; and
   fourth means for automatically providing a resource locator from the transaction processing system to the transaction initiator responsive to the identification of the transaction initiator, wherein the resource locator identifies a resource that is selected based on the identification of the transaction initiator.

39. A system to facilitate communications between a transaction initiator and a transaction processing system, a system including:
   first means for establishing a transaction between the transaction initiator and the transaction processing system;
   second means for receiving an identifier associated with the transaction at the transaction processing system as part of the establishment of the transaction, and as provided by the transaction initiator without prompting from the transaction processing system;
   third means for identifying the transaction initiator based on the identifier associated with the transaction; and
   fourth means for automatically providing a resource locator from the transaction processing system to the transaction initiator responsive to the identification of the transaction initiator, wherein the resource locator identifies a custom resource that is customized for the transaction initiator, based on the identification of the transaction initiator.

40. A computer-readable medium storing a sequence of instructions that, when executed by a machine, cause the machine to establish communications between a transaction initiator and a transaction processing system by a method including:

establishing a transaction between the transaction initiator and the transaction processing system, the transaction capable of supporting both voice and data communications between the transaction initiator and the transaction processing system;

receiving an identifier associated with the transaction at the transaction processing system, wherein the identifier is received automatically by the transaction processing system as a data communication and without prompting from the transaction initiator;

identifying the transaction initiator based on the identifier associated with the transaction; and automatically providing a resource locator from the transaction processing system to the transaction initiator responsive to the identification of the transaction initiator, wherein the resource locator identifies a resource that is selected based on the identification of the transaction initiator.

41. A computer-readable medium storing a sequence of instructions that, when executed by a machine, cause the machine to establish communications between a transaction initiator and a transaction processing system according to method including:

establishing a transaction between the transaction initiator and the transaction processing system;

receiving an identifier associated with the transaction at the transaction processing system as part of the establishment of the transaction, and as provided by the transaction initiator without prompting from the transaction processing system;

identifying the transaction initiator based on the identifier associated with the transaction; and automatically providing a resource locator from the transaction processing system to the transaction initiator responsive to the identification of the transaction initiator, wherein the resource locator identifies a custom resource that is customized for the transaction initiator, based on the identification of the transaction initiator.

\* \* \* \* \*